(12) United States Patent
Chirila (10) Patent No.: US 10,519,820 B2
(45) Date of Patent: Dec. 31, 2019

(54) COMBUSTION ENGINE INTAKE VALVE (71) Applicant: Laurian Petru Chirila, Irvine, CA (US)

(72) Inventor: Laurian Petru Chirila, Irvine, CA (US)

(*) Notice: Subject to any disclaimer, the term of this patent is extended or adjusted under 35 U.S.C. 154(b) by 238 days.

(21) Appl. No.: 15/339,642

(22) Filed: Oct. 31, 2016

(65) Prior Publication Data

US 2017/0122146 A1 May 4, 2017

Related U.S. Application Data

(60) Provisional application No. 62/249,774, filed on Nov. 2, 2015.

(51) Int. Cl.
*F01L 3/20* (2006.01)
*F01L 3/00* (2006.01)
*F01L 3/06* (2006.01)
*B21K 1/22* (2006.01)
*B23P 15/00* (2006.01)

(52) U.S. Cl.
CPC ............... *F01L 3/20* (2013.01);
*B21K 1/22* (2013.01); *F01L 3/00* (2013.01);
*F01L 3/06* (2013.01); *B23P 15/002* (2013.01);
*F01L 2101/00* (2013.01); *F01L 2103/00* (2013.01)

(58) Field of Classification Search
CPC ....... F01L 1/46; F01L 3/02; F01L 3/00; B23P 15/002
See application file for complete search history.

(56) References Cited

U.S. PATENT DOCUMENTS 2,371,548 A * 3/1945 Saffady .............. F01L 3/14
123/188.3
2,698,615 A * 1/1955 Dittmann .......... F01L 3/24
123/188.7

(Continued)

FOREIGN PATENT DOCUMENTS

DE 2003490 4/1971
DE 19941782 3/2001

(Continued)

OTHER PUBLICATIONS

Intake and Exhaust Valves and Mechanisms (Automobile), May 15, 2011, What-When-How, https://web.archive.org/web/20110515104235/http://what-when-how.com/automobile/intake-and-exhaust-valves-and-mechanisms-automobile/.*

(Continued)

*Primary Examiner* — Kevin A Lathers
(74) *Attorney, Agent, or Firm* — Fish IP Law, LLP (57) ABSTRACT

An intake valve for a combustion engine is described. The intake valve has a head portion that is designed to improve the flow of air-fuel mixture around the head portion and into the combustion chamber. The head portion has a beveled or rounded edge at the top surface. The angle changes from the underside surface to the top surface are rounded to prevent separation of the air-fuel mixture from the surface of the intake valve. In addition, the underside surface of the head portion has a plurality of helical grooves that induce a circular flow to improve mixing of the air-fuel mixture in the chamber. The helical grooves also improve heat exchange between the air-fuel mixture and the intake valve.

15 Claims, 14 Drawing Sheets

(56) References Cited

U.S. PATENT DOCUMENTS

| | | | |
|---|---|---|---|
| 2,757,655 A * | 8/1956 | Nallinger | F02B 23/00 |
| | | | 123/657 |
| 3,636,605 A * | 1/1972 | Vitcha | B22D 27/045 |
| | | | 123/188.3 |
| 3,903,855 A * | 9/1975 | Klakulak | F01L 1/28 |
| | | | 123/188.7 |
| 4,469,063 A * | 9/1984 | Sugiura | F02B 31/00 |
| | | | 123/188.14 |
| 4,815,706 A | 3/1989 | Feuling | |
| 5,485,815 A | 1/1996 | Shida | |
| 5,771,852 A * | 6/1998 | Heimann, Jr. | B23P 15/002 |
| | | | 123/188.11 |
| 6,098,590 A * | 8/2000 | Kutschera | F01L 3/22 |
| | | | 123/301 |
| 6,354,001 B1 | 3/2002 | Asanuma | |
| 9,784,145 B2 * | 10/2017 | Bush | F01L 3/06 |
| 2008/0011268 A1 * | 1/2008 | Sawyer | F01L 3/06 |
| | | | 123/306 |
| 2009/0114182 A1 | 5/2009 | Bush | |

FOREIGN PATENT DOCUMENTS

| | | |
|---|---|---|
| EP | 2287450 | 2/2011 |
| JP | 07-310512 | 11/1995 |
| JP | 2008-248735 | 10/2008 |
| JP | 2010-084698 | 4/2010 |
| JP | 2014-080891 | 5/2014 |

OTHER PUBLICATIONS

Mike Holler, Prepping Valves for Performance, Sep. 3, 2007, allpar.com, https://web.archive.org/web/20071003220917/http://www.allpar.com/fix/holler/valve-prepping.html.*

"The Inside Angle on Valve Seats: What you need to know to go with the flow" published in Engine Builder Magazine, Aug. 2008 edition (see http://www.enginebuildermag.com/2008/08/the-inside-angle-on-valve-seats-what-you-need-toknow-to-go-with-the-flow/).

International Search Report International application No. PCT/US2016/059773 dated Apr. 17, 2017.

Alfa Romeo Bulletin Board & Forums; Website; http://www.alfabb.com/bb/forums/engine-repair-diagnostics-rebuilding/167331-v6-head-porting-morons-like-me-hopefully-some-help-experts-like-alfar7-2.html; Oct. 28, 2015; 10 pages.

In Depth Tutorials and Information; "Intake and Exhaust Valves and Mechanisms (Automobile)"; http://what-when-how.com/automobile/intake-and-exhaust-valves-and-mechanisms-automobile/ Oct. 28, 2015; 24 pages.

Turbocharger Forums > Mechanical > performance & suspension; New Valves-Surface Turbulence; Oct. 28, 2015; http://forums.turbobricks.com/showthread.php?t=80786; Oct. 28, 2015; 11 pages.

W8Wizard; "The Definitive Rover V8 Engine Knowledge Base for Range Rover, Land Rover, TVR, Morgan, Marcos & Classic Cars Running Rover VS Engines"; Oct. 28, 2015 http://www.v8wizard.c:om/3-andle-valves.php.

Grumpys Performance Garage "valve seat angles and air flow"; Oct. 26, 2015—56 pages. http://garage.grumpysperformance.com/index.php?threads/valve-seat-angles-and-air-flow.8460/.

Extended European Search Report, European Patent Appl. No. 16862766.9 (dated Apr. 29, 2019).

* cited by examiner

|         | 40 km/h |         |        | CURB IDLE |         |        |
|---------|---------|---------|--------|-----------|---------|--------|
|         | Limit   | Reading | Result | Limit     | Reading | Result |
| HC ppm  | 58      | 14      | PASS   | 150       | 12      | PASS   |
| CO %    | 0.32    | 0.02    | PASS   | 0.7       | 0.03    | PASS   |
| NO ppm  | 0435    | 130     | PASS   |           |         |        |
| RPM     |         | 0       | VALID  | RPM       | 0       | VALID  |
| Dilution|         | 14.42   | VALID  | Dilution  | 14.23   | VALID  |

FIG. 16

|         | 40 km/h |         |        | CURB IDLE |         |        |
|---------|---------|---------|--------|-----------|---------|--------|
|         | Limit   | Reading | Result | Limit     | Reading | Result |
| HC ppm  | 55      | 6       | PASS   | 150       | 6       | PASS   |
| CO %    | 0.31    | 0.00    | PASS   | 0.7       | 0.00    | PASS   |
| NO ppm  | 0408    | 207     | PASS   |           |         |        |
| RPM     |         | 713     | VALID  | RPM       | 894     | VALID  |
| Dilution|         | 14.20   | VALID  | Dilution  | 14.30   | VALID  |

FIG. 17

COMBUSTION ENGINE INTAKE VALVE

FIELD OF THE INVENTION

The field of the invention is intake valve designs for combustion engines.

BACKGROUND

The background description includes information that may be useful in understanding the present invention. It is not an admission that any of the information provided herein is prior art or relevant to the presently claimed invention, or that any publication specifically or implicitly referenced is prior art.

Vehicles with combustion engines produce a significant percentage of the greenhouse gases that are emitted into the earth's atmosphere each year. Governments throughout the world are increasing concerned with our society's ecological footprint and are striving to raise the bar in environmental regulations and laws. Much research has been done to improve the efficiency of the modern combustion engine, in an effort to meet the rising environmental regulations.

Various design modifications for combustion engine intake valves have been implemented over the years in an attempt to improve combustion efficiency. An article titled "the Inside Angle on Valve Seats: What you need to know to go with the flow" published in Engine Builder Magazine, August 2008 edition (see http://www.enginebuildermag.com/2008/08/the-inside-angle-on-valve-seats-what-you-need-to-know-to-go-with-the-flow/) describes the early work of Joe Mondello on including multi-angle surfaces on valve seats to improve air flow into the combustion chamber. The principles of multi-angle valve seats developed by Joe Mondello provide a foundation for modern intake valve designs. While the addition of various surface angles has provided some improves, there remains a significant challenge in achieving additional advances in combustion efficiencies through with new intake valve designs. This is due, in part, to an infinite number of possible combinations of modifications (e.g., ratios of angles, ratios of surface areas between the intake valve and the valve seat, etc) and the numerous dynamic factors that are present in a combustion engine (e.g., temperature, engine speed, number of pistons, size of engine, etc.). Unfortunately, this has led to a stagnant state in intake valve design. There remains a significant need for improved intake valve designs.

Thus, there is still a need for improved intake valve designs for combustion engines.

SUMMARY OF THE INVENTION

The present inventive subject matter provides apparatus, systems, and methods in which an intake valve for a combustion engine has a head portion with a softened edge. More specifically, the head portion comprises a top surface opposite of an underside surface, and a stem portion extending from the underside surface. The edge surrounding the top surface is or beveled and rounded to provide a softened flow path around which an air-fuel mixture can more easily flow. In addition, the underside surface has a first angled surface and a second angled surface, with a rounded transition between the first and second angled surface. The rounded surfaces and edges that transition from the underside surface to the top surface take advantage of the Coanda effect, which is the tendency of a fluid stream to be attracted to a nearby surface. As the air-fuel mixture passes over the rounded edges, the mixture has a tendency to stay near the surface, which results in a smaller air pocket near the center of the top surface.

The inventive subject matter further includes a plurality of helical grooves on the underside surface of the head portion. The grooves are disposed radially around the stem portion in either a clockwise or counterclockwise direction. Each of the plurality of helical grooves is separated by a helical protrusion or blade. The grooves and blades cause the air-fuel mixture flowing around the head portion to spin or swirl in a circular motion, thereby preventing air-fuel separation and reducing the size of the air pocket that forms on the top surface of the head portion.

Another advantage of the helical grooves and blades is that they increase the surface area between the intake valve and the air-fuel mixture, thus promoting a better heat exchange between the air-fuel mixture and the intake valve. More specifically, the increase surface contact between the intake valve and the air-fuel mixture allows the air-fuel mixture to heat more while the intake valve is cooled more. The helical groove and blades also increase the path of the air-fuel mixture over the underside of the intake blade (since a curved path is longer than a straight path), thus providing more time for heat to exchange between the intake valve and the air-fuel mixture.

Yet another advantage of the helical blades is their ability to act as air fin coolers, allowing the intake valve to cool more rapidly to a lower temperature. In addition, the helical groove design allows more material to be removed from the head portion of the intake valve, thus reducing the weight of the intake valve without compromising the structural integrity of the head portion. This provides at weight-savings that improves the operational efficiency and the fatigue and creep properties of the engine (e.g., greater longevity and lower maintenance costs).

In other aspects, the underside surface of the head portion can include a first angled surface and a second angled surface. The different angles and surface areas of the underside surface are configured to improve air flow around the head portion and into a combustion chamber. The angles surfaces also correspond with the angles and surfaces of a valve seat in the opening of a combustion chamber.

From a methods perspective, the inventive subject matter includes a method of modifying a stock intake valve. The stock intake valve has a head portion that comprises a multi-angled underside surface. For example, the underside surface may include a first angled surface that meets with a second angled surface, which then joins with a perpendicular surface, which joins with a top surface at a right angle. The method of modifying the stock intake valve includes the steps of (i) beveling or rounding the right angle; and (ii) cutting a plurality of helical grooves in the first angled surface. The method may also include the steps of rounding all transitional angles and edges going from the underside surface to the top surface. In this manner, air flow around the head portion of the intake valve is improved by taking advantage of the Coanda affect, thus reducing the air pocket next to the top surface of the head portion and improving combustion efficiency. The modified intake valve is especially useful in improving combustions efficiencies when the combustion engine is running at low RMPs.

From another methods perspective, the inventive subject matter includes a method of manufacturing an intake valve with rounded or smooth edges on the head portion. The method of manufacturer can include preparing a mold that has smooth or rounded angle changes and edges on the head portion of the intake valve impression. In addition, the mold can include a plurality of helical grooves and helical blades on the underside surface of the head portion. The method can further include the step of using the mold to manufacture an intake valve, such as by stamping, forging, or casting.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
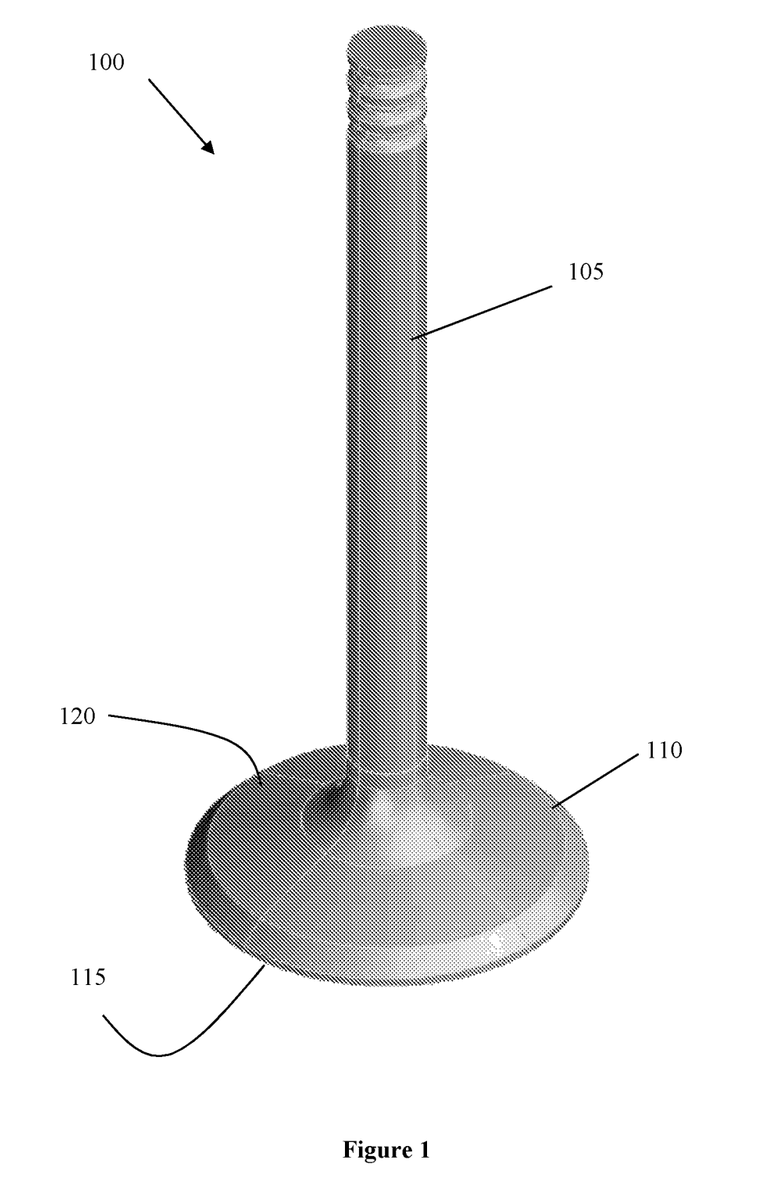
FIG. 1 is a top perspective view of a stock intake valve.
Figure 2:
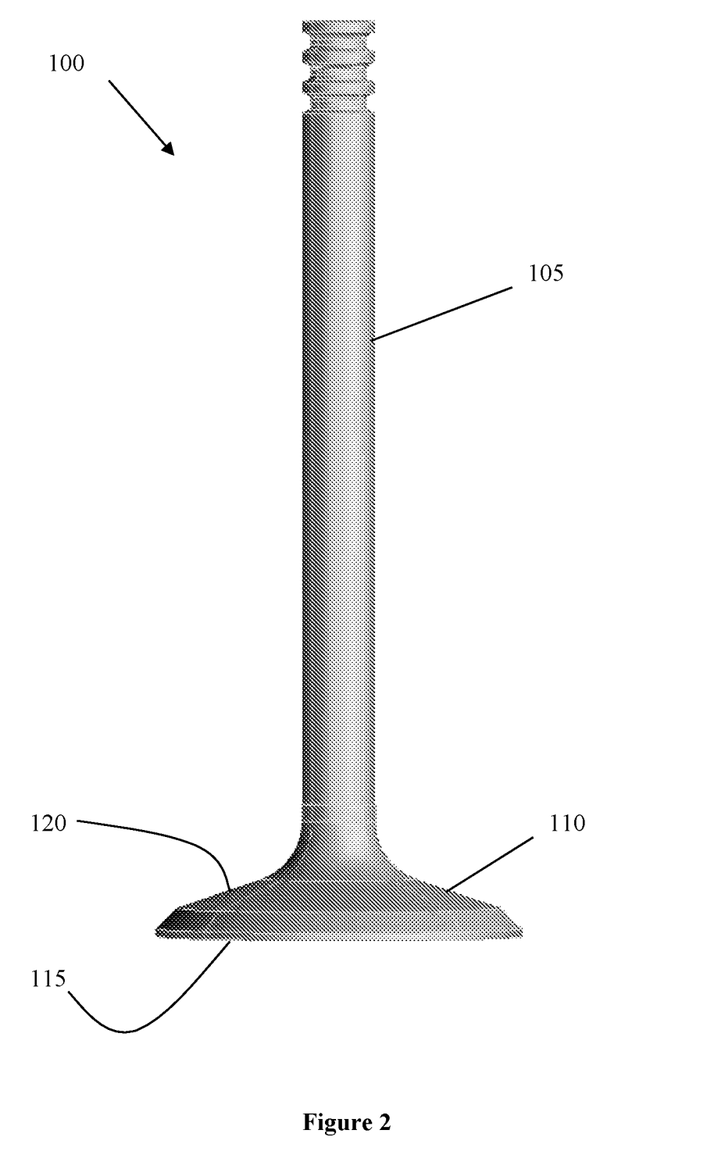
FIG. 2 is a side view of the intake valve of FIG. 1.
Figure 3:
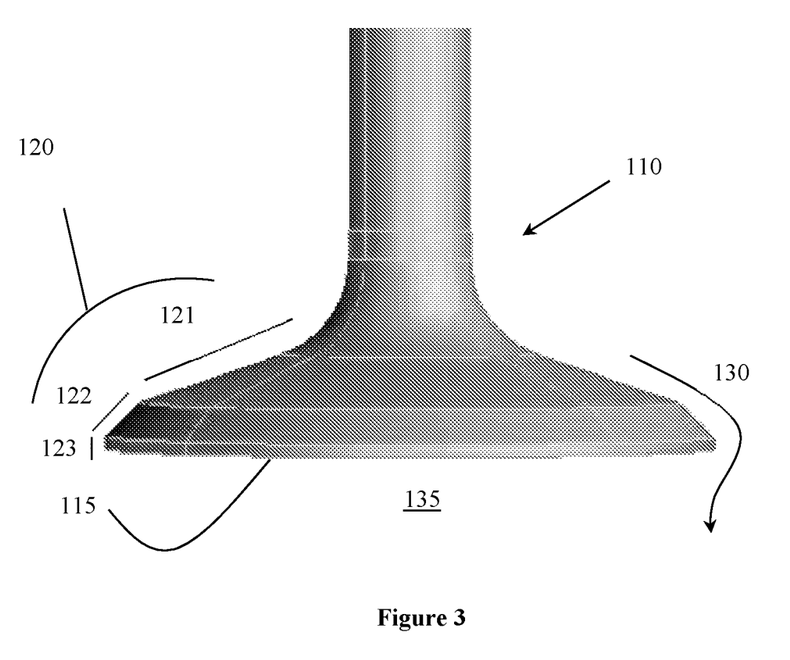
FIG. 3 is a side close-up view of the head of the intake valve of FIG. 1.

FIG. 1 shows a stock intake valve 100 for a combustion engine. Valve 100 has a stem portion 105 and a head portion 110. Head portion 110 has a top surface 115 that faces away from stem portion 105. Head portion 110 also has an underside surface 120 that faces towards stem portion 105. FIG. 2 shows a side view of stock intake valve 100 and FIG. 3 shows a close-up side view of head portion 110. As best seen in FIG. 3, underside surface 120 has a first angled surface 121, a second angled surface 122 and a perpendicular surface 123. The angles of surfaces 121 and 122 are configured to slidably engage with angles surfaces of a valve seat in a combustion engine.

First angled surface 121 joins with second angled surface 122 at a hard edge (e.g., a sharp edge or abrupt angle change). In addition, perpendicular surface 123 meets with top surface 115 at a right angle and forms a hard edge. As an air-fuel mixture flows around these hard edges in the direction shown by air 130, the air-fuel mixture tends to separate from the surface of the intake valve and an air pocket forms adjacent to the center of top surface 115 in space 135. The size of the air pocket is larger when the combustion engine runs at lower revolutions per minute (RPMs) and smaller when the engine runs at higher RPMs. This is because the greater frequency of air-fuel injections experienced and the greater fluid dynamics of air flow at higher RPMs has a tendency to agitate the air-fuel mixture within the piston chamber and push the mixture into the air pocket. At lower RPMs the larger air pocket creates a less efficient combustion of the air-fuel mixture. This decreased efficiency at lower RPMs produces a higher quantity of emissions and increases operational costs.

Figure 4:
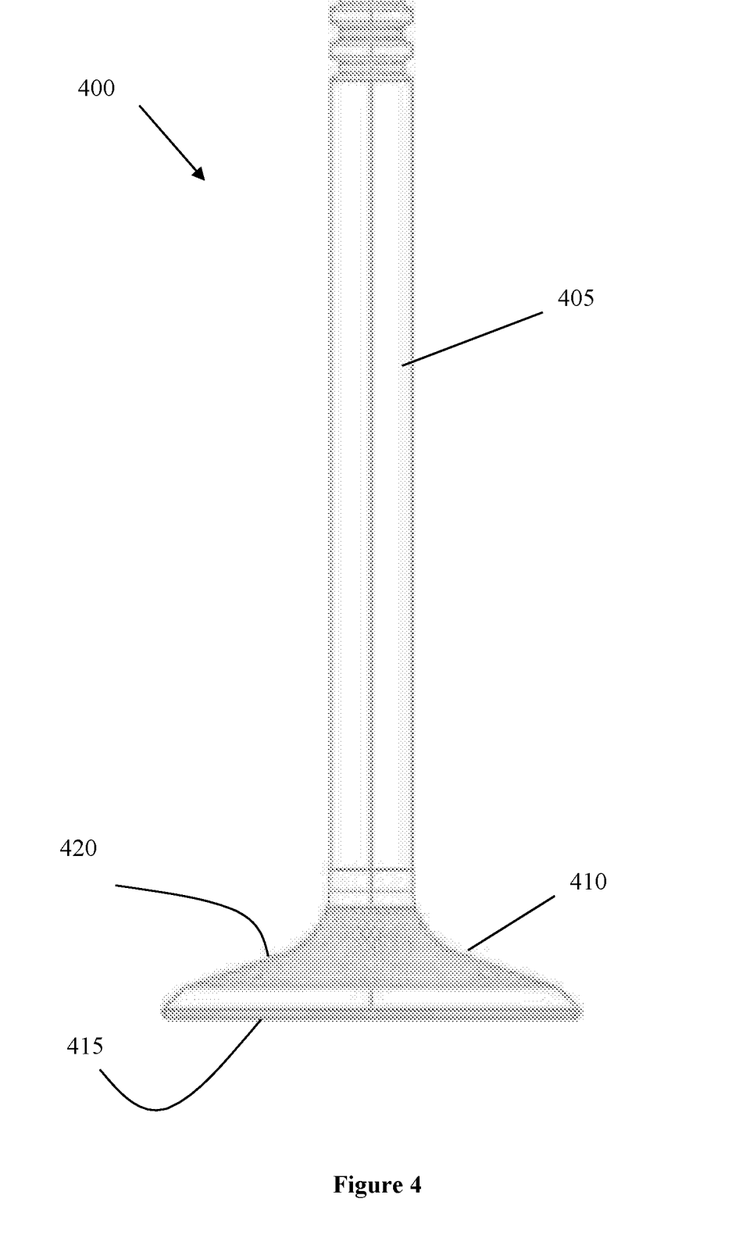
FIG. 4 is a side view of a modified intake valve.
Figure 5:
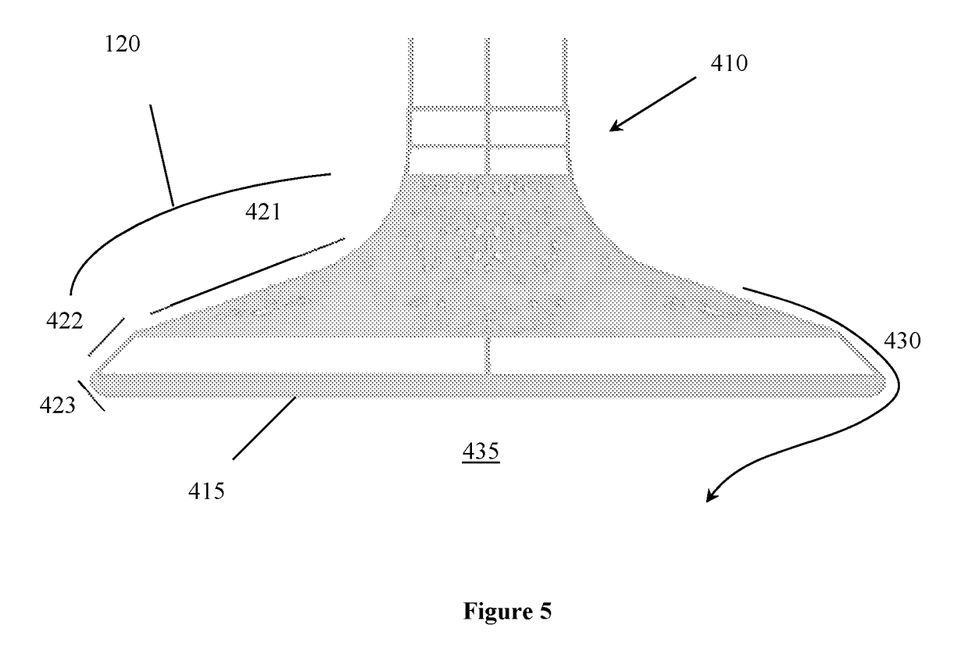
FIG. 5 is a side close-up view of the head of the modified intake valve of FIG. 4.

FIG. 4 shows a modified intake valve 400. Valve 400 is very similar to valve 100 in most aspects and has a stem portion 405, head portion 410, an underside surface 420, and a top surface 415. In addition, underside surface 420 has a first angled surface 421 and a second angled surface 422, as best seen in FIG. 5. However, valve 400 is different from valve 100 in that the transition from first angled surface 421 to second angles surface 422 is rounded (e.g., softened, gradual, etc) and the transition from second surface 422 to beveled edge 423 is also rounded. Valve 400 is also different from valve 100 in that top surface 415 has a beveled edge 423 (e.g., a "top cup" or "top surface angle") rather than a right angle between top surface 415 and underside surface 120. These rounded surfaces allow the air-fuel mixture to flow more easily around the perimeter of head portion 410 by taking advantage of the Coanda affect, as shown by arrow 430. Beveled edge 423 and the rounded transitions decrease the size of the air pocket at space 435 adjacent to top surface 415 compared to the air pocket that forms in space 135 of valve 100 (when all other parameters are constant).

Figure 16:
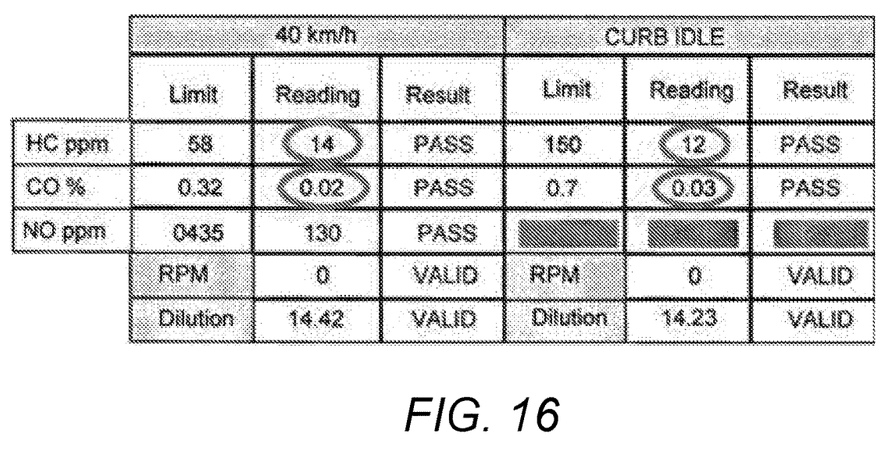
FIG. 16 shows emissions data from a California Vehicle Emissions Inspection Report for a 2001 Chrysler Sebring using valves similar to the valve shown in FIG. 4.

The inventor has observed a tremendous improvement in vehicle emissions test results when stock intake valve 100 was modified to include a beveled edge and rounded transitional edges/surfaces as shown in valve 400. The degree of efficiency improvement is unexpectedly significant in view of such a minor modification to the stock valve design. FIG. 16 shows emissions data from a California Vehicle Emissions Inspection Report for a 2001 Chrysler Sebring (2.7 liter engine, 6 cylinders, 4 valves per cylinder—2 intake valves and 2 exhaust valves) that has valves similar to valve 400.

As one can see, at 40 km/h (approx. 25 mph) the HC emissions are more than 4 times better than the limit and the CO % emissions are 16 times better than the limit. At curb idle the HC emissions are 12.5 times better that the limit and CO % emissions are more than 23 times better that the limit. These results far exceed what a person of ordinary skill in the art would expect. Curb idle limits are higher than 40 km/h limits due to the engine's inability to mix the air-fuel mixture well inside the combustion chamber at lower RPMs. Despite this known challenge, the test data unexpectedly shows an improvement in HC emissions for curb idle compared to 40 km/h HC emissions, and also shows comparable CO % emissions for curb idle and 40 km/h (e.g., 0.03 and 0.02). Inventor hypothesizes that the unexpectedly improved curb idle emissions results are due to the fact that the Coanda affect is greater at lower RPMs (or at has an equal affect at low and high RPMs).

Figure 6:
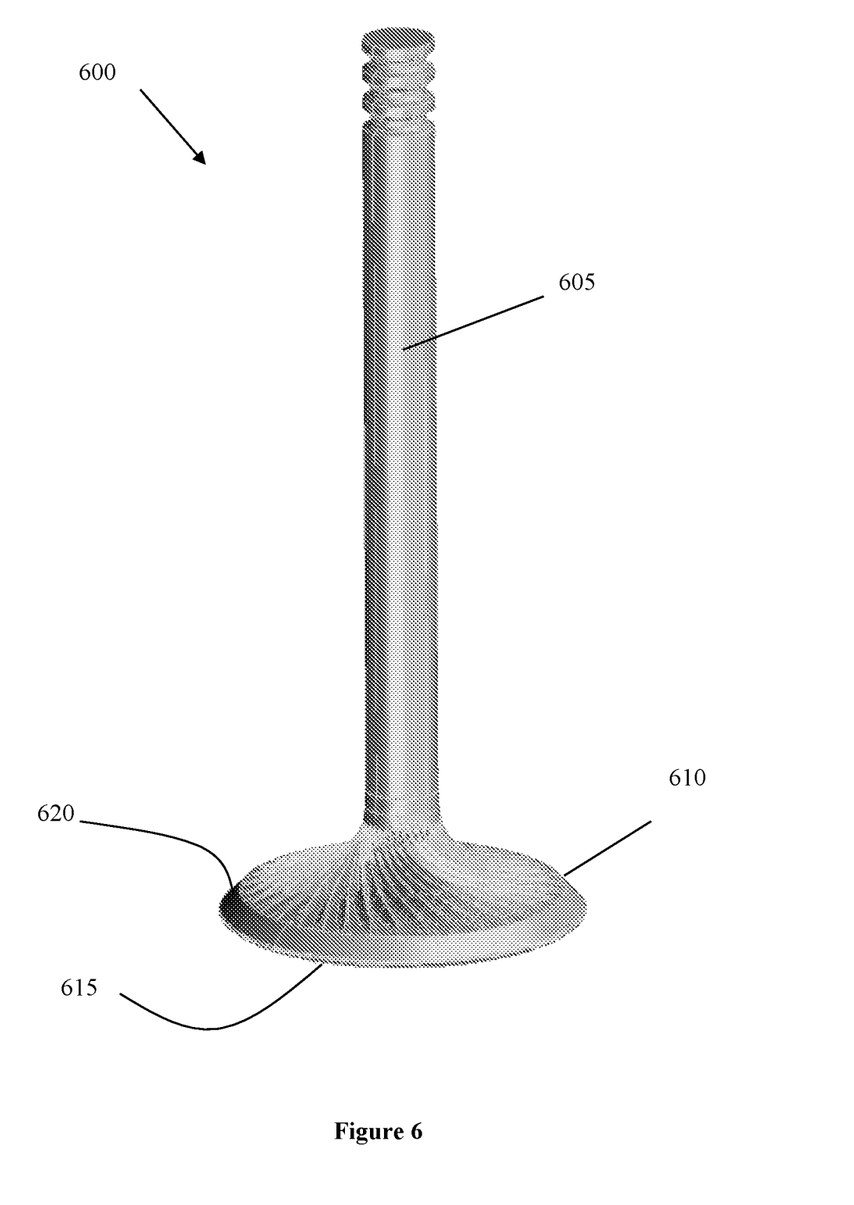
FIG. 6 is a top perspective view of a modified intake valve with counter clock wise helical grooves.
Figure 7:
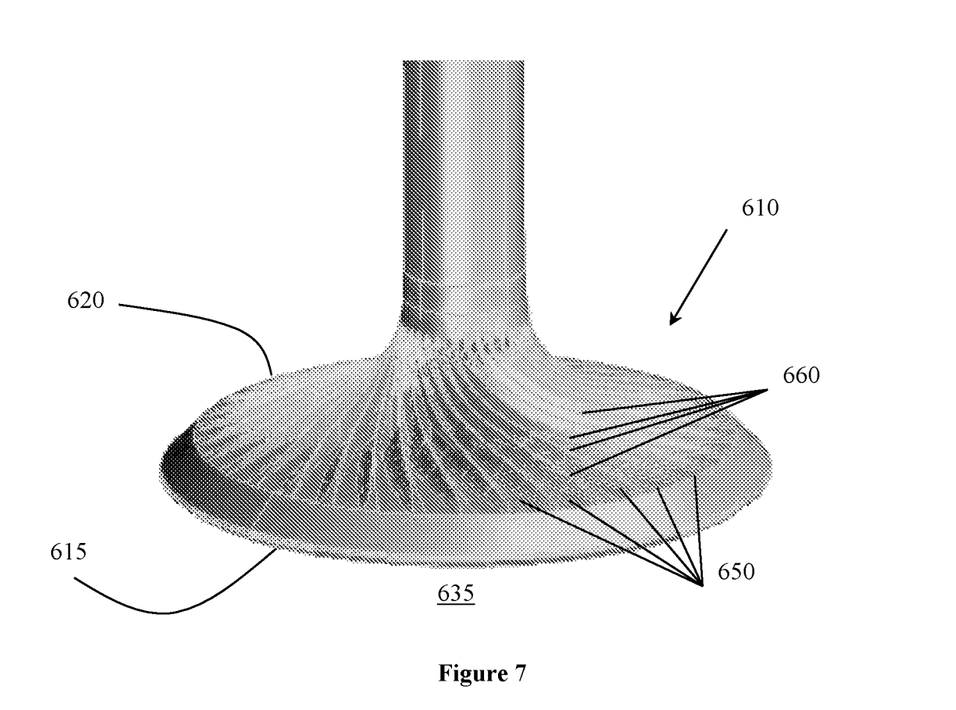
FIG. 7 is a top perspective close-up view of the head of the intake valve of FIG. 6.
Figure 8:
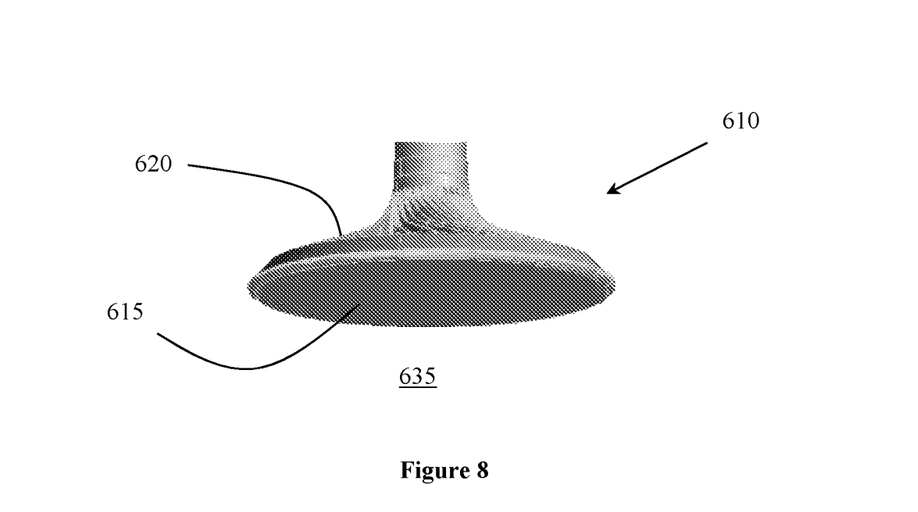
FIG. 8 is a bottom perspective view of the head of the intake valve of FIG. 6.
Figure 9:
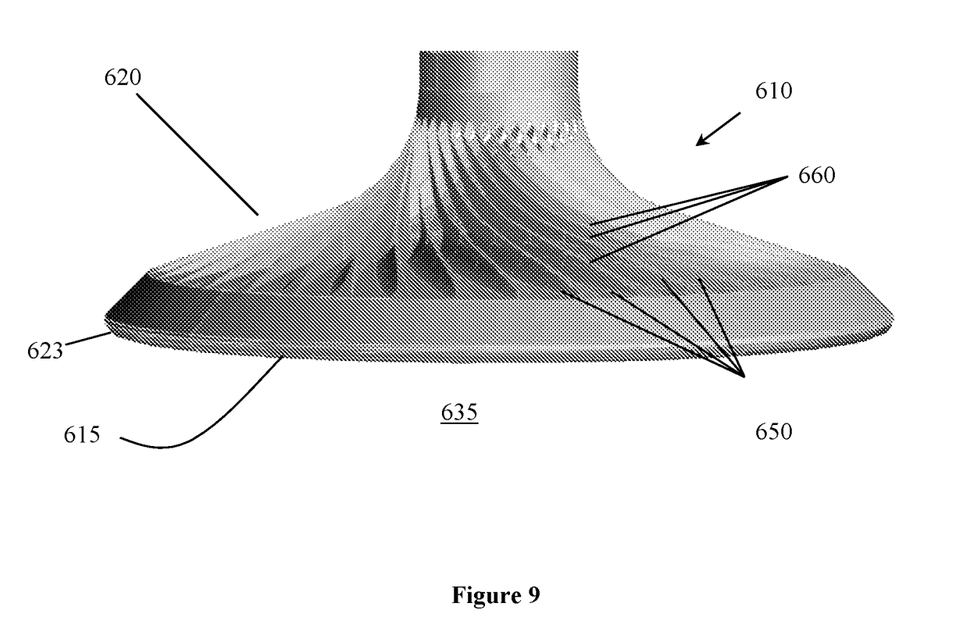
FIG. 9 is a side close-up view of the head of the intake valve of FIG. 6.

FIG. 6 shows a modified intake valve 600. Valve 600 has a stem portion 605, a head portion 610, an underside surface 620, and a top surface 615. Valve 600 is similar to valve 400 except that the underside surface 620 has a plurality of helical grooves 650 disposed radially and counterclockwise around the center of surface 620, as best seen in FIGS. 7-9. In particular, each of the plurality of grooves 650 is separate by one of a plurality of helical protrusions 660 (e.g., blades). The grooves 650 and protrusions 660 cause an air-fuel mixture flowing around head portion 610 to spiral in a circular motion, which helps to keep the air-fuel mixture from separating.

Together, beveled edge 623, grooves 650, and the smooth/rounded surfaces help to greatly improve combustion efficiency and reduce emissions compared to stock intake valve 100. In particular, the induced circular flow also helps to decrease the size of the air pocket at space 635, lengthen the time the air/fuel mixture is traveling on the valve surface thereby increasing air-fuel mixture temperature and cooling the intake valve. The helical grooves also reduce the weight of the intake valve without compromising structural integrity. The reduced intake valve temperatures and the reduced weight of the intake vale (e.g., decreased inertia during cyclical up-down movement) helps the seal and oil at the stem portion to last longer and reduces energy to operate. All of these factors improve overall performance and reduce operational costs of a combustion engine.

In alternative embodiments, it is contemplated that helical grooves 650 and helical protrusions 660 need not be perfectly helical or equally sized and distanced, so long as the grooves and protrusions are sufficiently sized, dimensioned, and curved enough to induce a circular or spiral air-fuel mixture flow path and improve heat exchange between the air-fuel mixture and the intake valve.

Figure 17:
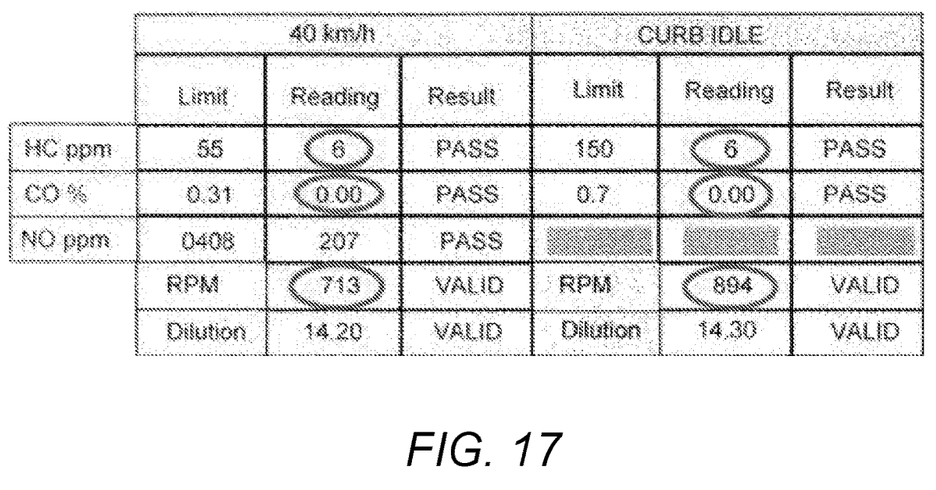
FIG. 17 shows emissions data from a California Vehicle Emissions Inspection Report for a 2000 Chrysler Concorde using valves similar to the valve shown in FIG. 6.

FIG. 17 shows emissions data from a California Vehicle Emissions Inspection Report for a 2000 Chrysler Concorde (2.7 liter engine, 6 cylinders, 4 valves per cylinder—2 intake valves and 2 exhaust valves) that has valves similar to valve 600.

As one can see, at 40 km/h (approx. 25 mph) the HC emissions are now more than 9 times better than the limit and the CO % emissions are infinitely better than the limit (e.g., 0.00 CO % emissions). At curb idle the HC emissions are 25 times better that the limit and CO % emissions are infinitely better than the limit. In addition, while testing this car, the inventor observed a significant increase to torque and lower RPMs at 25 mph. These results far exceed what a person of ordinary skill in the art would expect from minor changes to the intake valves. The inventor hypothesizes that the drastically significant improvement in emissions data and performance, especially at lower RPMs, is the result of the Coanda affect and improved heat exchange between the intake valve and the air-fuel mixture.

Figure 10:
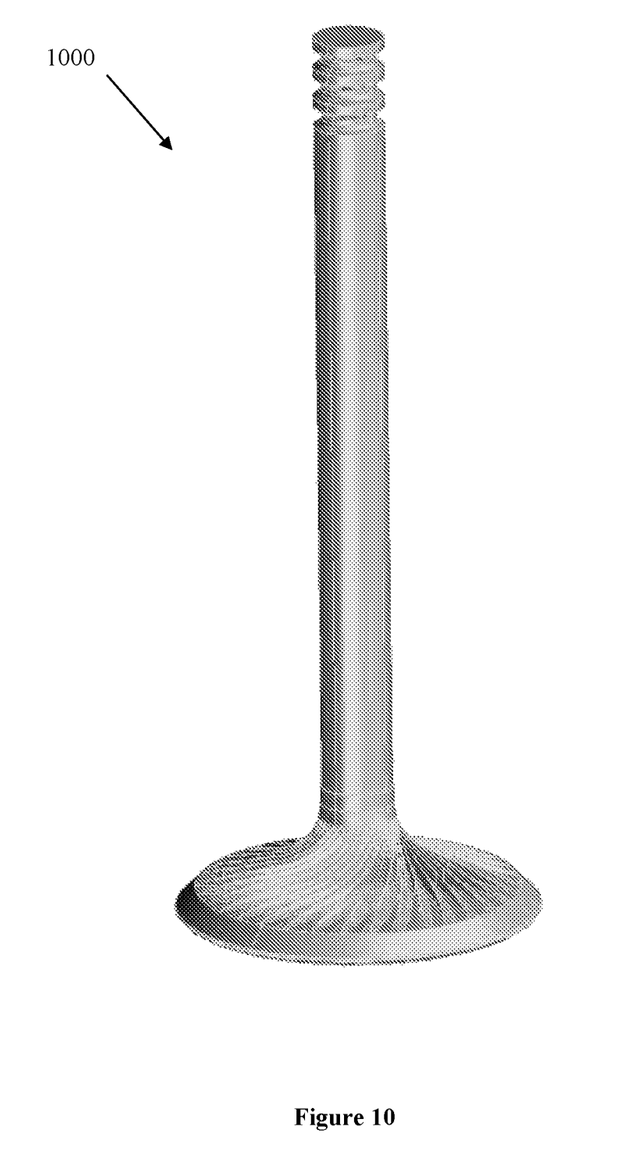
FIG. 10 is a top perspective view of a modified intake valve with clockwise helical grooves.
Figure 11:
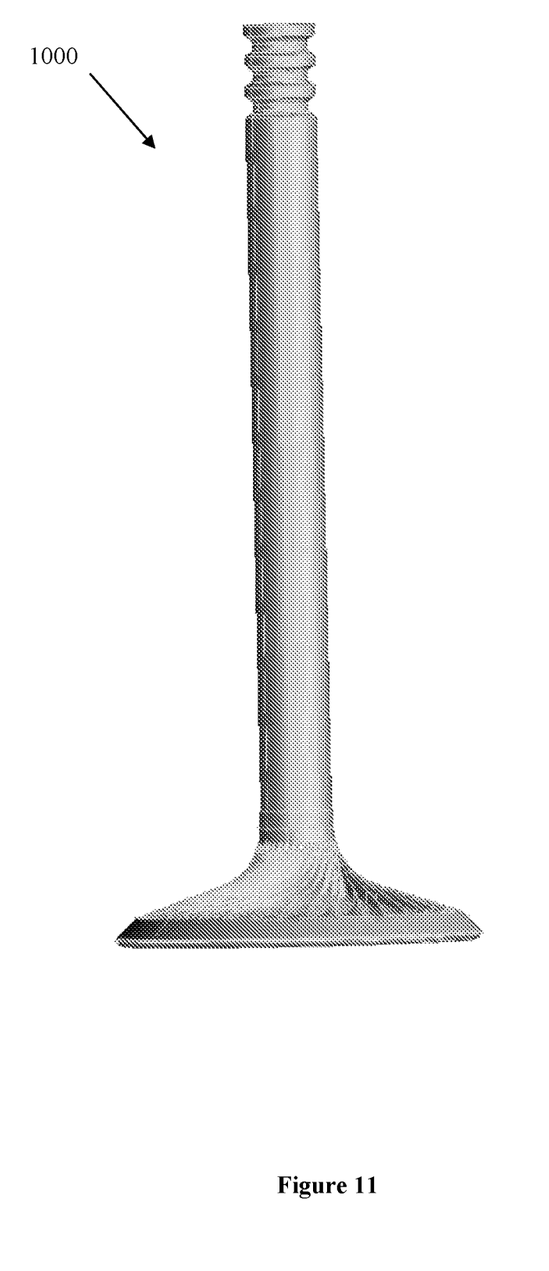
FIG. 11 is a side view of the intake valve of FIG. 10.
Figure 12:
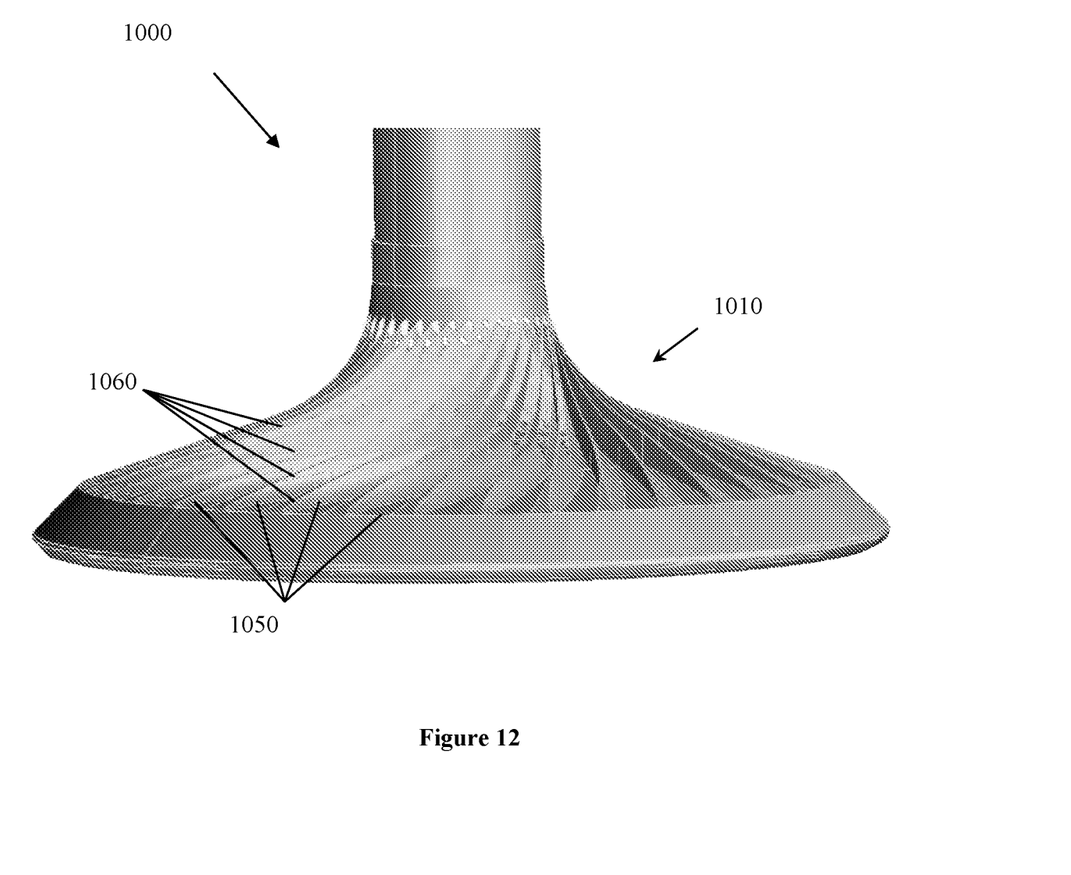
FIG. 12 is a side close-up view of the head of the intake valve of FIG. 10.

FIGS. 10-12 shows a modified intake valve 1000. Valve 1000 is identical to valve 600 in all aspects except that its plurality of helical grooves 1050 and its plurality of protrusions 1060 are oriented clockwise rather than counterclockwise. For engines that have two or more intake valve per cylinder, it is advantageous for two adjacent intake valves to have different helical groove directions (e.g., clockwise and counterclockwise) to improve mixing of the two air-fuel mixtures that are injected into the chamber.

Figure 13:
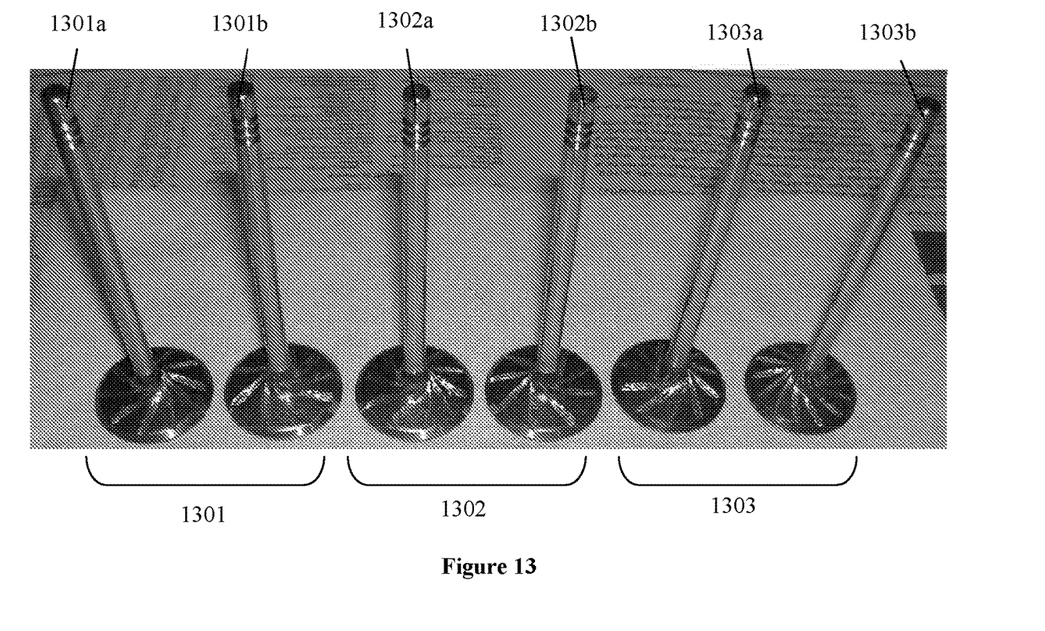
FIG. 13 is a top perspective view of three pairs of intake valves.
Figure 14:
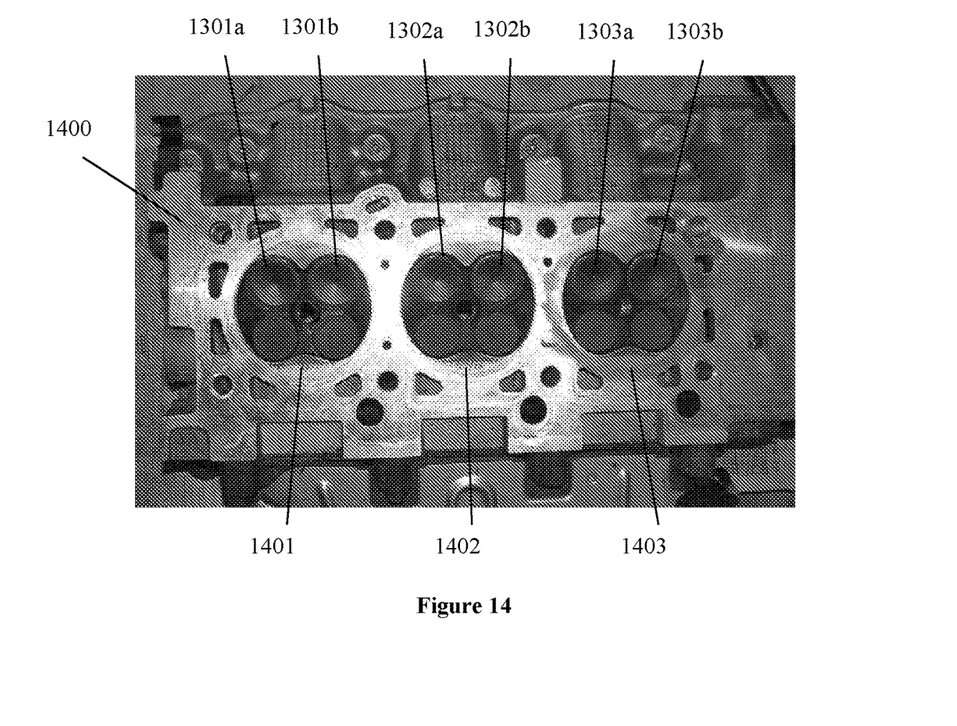
FIG. 14 is a top perspective view of the head of an engine block with the three pairs of intake valves of FIG. 13 installed in three cylinder chambers.

FIG. 13 shows a three pairs of intake valves 1301, 1302, and 1303. Each pair of intake valves has an intake valve with clockwise helical grooves (e.g., 1301a, 1302a, 1303a) and an intake valve with counterclockwise helical grooves (e.g., 1301b, 1302b, 1303b). FIG. 14 shows the three pairs of intake valves 1301, 1302, and 1303 installed in one of three chambers 1401, 1402, 1403 in a 6 cylinder engine. (FIG. 14 shows only one side of engine block 1400. The other side of engine block 1400 has an additional 3 cylinders/chambers, not shown). Each pair of intake valves 1301, 1302, and 1303 helps to mix the two air-fuel streams that are injected into each chamber, by inducing a clockwise stream and counterclockwise stream. The improved mixing helps to reduce emissions and improve performance of the engine.

Figure 15:
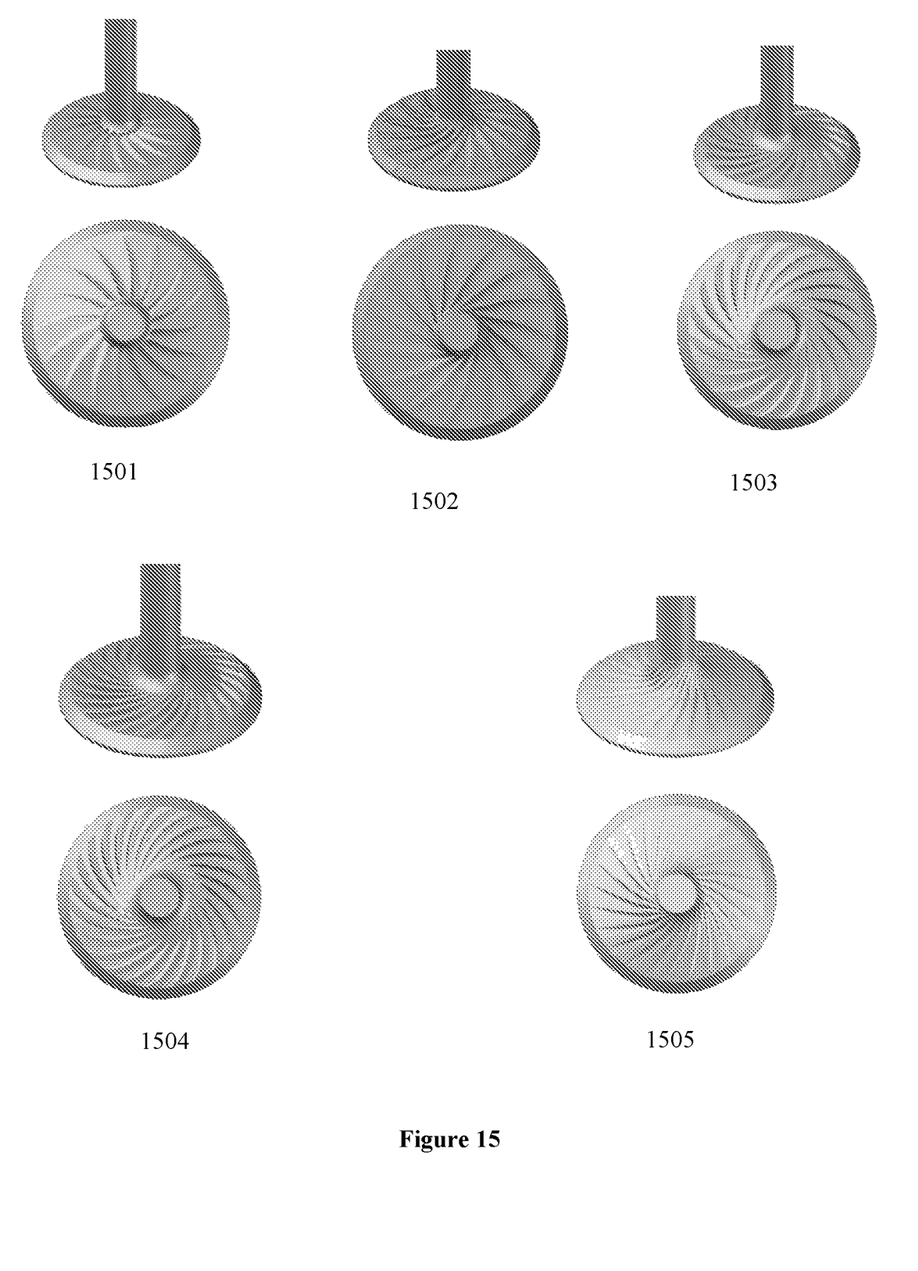
FIG. 15 are top perspective views and plan views of five additional configurations of head portions of intake valves that have helical grooves.

FIG. 15 shows top perspective views and plan views of five alternative embodiments 1501-1505. Embodiments 1501-1505 have different configurations of helical grooves on the underside surface of the head portion of the intake valve. The different embodiments illustrate the variations in parameters that are possible with the present inventive subject matter. For example, the number of grooves/blades, the spacing between each bade (equal vs. non equal spacing), the curvature of the grooves/blades (constant curvatures vs. non-constant curvatures), the depth of the grooves and height of the blades, and direction of the grooves (clockwise, counterclockwise) can vary significantly between different embodiments, without departing from the inventive principles disclosed herein.

In other aspects, the inventive subject matter includes methods of manufacturing a more efficient intake valve. The methods can include the step of modifying stock intake valve by rounding, chamfering, beveling, or otherwise softening a hard edge of a top surface of the head portion of the stock intake valve. Preferably, all of the hard edges on the underside surface, and transitioning from the underside surface to the top surface, are rounded or softened in order to provide a continuously smooth surface. In this manner, the smooth edges and angle changes provide a surface that takes advantage of the Coanda affect and improves flow of an air-fuel mixture around the head portion of the intake valve. Contemplated methods can also include the step of cutting, machining, casting or otherwise producing helical grooves on the underside surface of the head portion of the stock intake valve, thereby reducing the weight of the stock intake valve.

Methods of manufacturing a more efficient intake valve also include the steps of preparing and/or providing a mold or die that has a negative impression of a head portion of an intake valve with smooth edges and angle changes. More specifically, the underside surface of the head portion in the mold or die can have a first angled portion that smoothly and gradually transitions to a second angle. The second angle can then smoothly and gradually transition to a beveled edge on the top surface of the head portion. Finally, the transition from the beveled edge to the top surface can have a smooth or rounded surface. The mold or die may also have one or more helical grooves and helical blades for on the underside surface of the head portion. The mold or die can be used in a stamping or forging process with compression to shape and press a metal alloy (or some other suitable material) into the shape of an intake valve with rounded edges and smooth transitions. In this manner, the inventive subject matter described herein provides methods of manufacturing intake valves that reduces emissions and reduce the fuel costs for operating a combustion engine.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Thus, specific configurations, designs, and methods of manufacturing intake valves have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An intake valve for a combustion engine, comprising:
a head portion having a top surface opposite of an underside surface, wherein the underside surface comprises a first angled surface and a second angled surface;
a stem portion extending from the first angled surface of the underside surface;
wherein the top surface is substantially planar and has a beveled edge;
wherein the transition from the first angled surface to the second angled surface is rounded; and
wherein the transition from the second angled surface to the beveled edge is rounded such that a coando effect is produced in an air-fuel mixture flowing from the second angled surface to the top surface to thereby reduce an air pocket size adjacent to the top surface.

2. The intake valve of claim 1, wherein the underside surface has a plurality of helical grooves.

3. The intake valve of claim 2, wherein the helical grooves are disposed radially around the stem portion in a counter-clockwise direction.

4. The intake valve of claim 2, wherein the helical grooves are disposed radially around the stem portion in a clockwise direction.

5. The intake valve of claim 2, wherein each of the plurality of helical grooves is separated by one of a plurality of helical blades.

6. The intake valve of claim 1, wherein the first angled surface and the second angled surface are sized and dimensioned to mate with a valve seat in a chamber.

7. A method of modifying a stock intake valve, wherein the stock intake valve comprises a head portion having an underside surface that includes a first angled surface, a second angled surface, and a perpendicular surface, wherein the perpendicular surface joins with a top surface at a right angle, the method comprising:
rounding a first edge where the first angled surface and second angled surface meet;
beveling or rounding the right angle to create a beveled edge;
rounding a second edge where the second angled surface and the beveled edge meet;
rounding a third edge where the beveled edge and top surface meet; and
cutting a plurality of helical grooves in the first angled surface.

8. The method of claim 7, wherein the step of beveling or rounding the right angle comprises the step of cutting material from the right angle at a 45 degree angle.

9. The method of claim 7, wherein the step of beveling or rounding the right angle comprises the step of cutting material from the right angle at a bevel angle between 30-60 degrees.

10. The method of claim 7, further comprising the step of polishing the beveled or rounded edge.

11. A method of manufacturing an intake valve comprising:
providing a mold or die having a negative impression of the intake valve, wherein the negative impression comprises a head portion that comprises (i) an underside surface having a first angled surface and a second angled surface that meet at a rounded edge, and (ii) a top surface that joins the second angled surface at a beveled edge, the transition from the second angled surface to the beveled edge being rounded;
using the mold or die to form a head portion of an intake valve.

12. The method of claim 11, wherein the step of using the mold or die includes the step of compressing a solid material in the mold or die.

13. The method of claim 12, wherein the solid material is a metal alloy.

14. The method of claim 13, further comprising the step of heating the metal alloy prior to compressing the metal alloy in the mold or die.

15. The method of claim 11, wherein the step of using the mold or die includes a casting process.

\* \* \* \* \*